United States Patent
Heim et al.

(10) Patent No.: US 8,996,506 B2
(45) Date of Patent: Mar. 31, 2015

(54) DUPLICATE SEARCH OPTIMIZATION

(75) Inventors: Itamar Heim, Tel Aviv (IL); Vitaly Elyashev, Ramat Gan (IL); Amos Benari, Yokneam Hamoshava (IL)

(73) Assignee: Red Hat Israel, Ltd., Raanana (IL)

( * ) Notice: Subject to any disclaimer, the term of this patent is extended or adjusted under 35 U.S.C. 154(b) by 33 days.

(21) Appl. No.: 13/073,235

(22) Filed: Mar. 28, 2011

(65) Prior Publication Data

US 2012/0254155 A1    Oct. 4, 2012

(51) Int. Cl.
*G06F 17/30* (2006.01)

(52) U.S. Cl.
CPC .............................. *G06F 17/30979* (2013.01)
USPC ......................................... 707/721; 707/758

(58) Field of Classification Search
CPC ................... G06F 17/30029; G06F 17/30424; G06F 17/30233; G06F 17/30368; G06F 17/30477; G06F 17/30489; G06F 17/30864; G06F 17/30979
USPC .................................................. 707/705–780
See application file for complete search history.

(56) References Cited

U.S. PATENT DOCUMENTS

| | | | | |
|---|---|---|---|---|
| 6,009,271 | A * | 12/1999 | Whatley | 717/127 |
| 6,766,315 | B1 * | 7/2004 | Bratsos et al. | 1/1 |
| 7,406,691 | B2 * | 7/2008 | Fellenstein et al. | 718/104 |
| 7,925,782 | B2 * | 4/2011 | Sivasubramanian et al. | 709/238 |
| 8,019,735 | B2 * | 9/2011 | White | 707/690 |
| 8,060,524 | B2 * | 11/2011 | Schechter et al. | 707/768 |
| 8,495,056 | B2 * | 7/2013 | Le Pennec et al. | 707/718 |
| 2010/0332489 | A1 * | 12/2010 | Benari et al. | 707/759 |
| 2011/0055202 | A1 * | 3/2011 | Heimendinger | 707/721 |
| 2011/0099187 | A1 * | 4/2011 | Hansen | 707/769 |
| 2011/0202831 | A1 * | 8/2011 | Bruckner et al. | 715/246 |
| 2011/0213765 | A1 * | 9/2011 | Cui et al. | 707/711 |
| 2012/0096457 | A1 * | 4/2012 | Gupta et al. | 718/1 |

OTHER PUBLICATIONS

"Solid ICE Overview", Qumranet, Apr. 2008.*

* cited by examiner

*Primary Examiner* — Michelle Owyang

(74) *Attorney, Agent, or Firm* — Lowenstein Sandler LLP

(57) ABSTRACT

A method and system for providing up-to-date monitoring results in a virtual machine environment are described. In one embodiment, a host controller receives a new query pertaining to at least one object in a virtual machine system from a client, and determines whether the new query is similar to any queries previously received from other clients. If the new query is similar to any of the previously received queries, the host controller provides data pertaining to a result of a last execution of the similar query to the client. If the new query is not similar to any of the previously received queries, the host controller executes the new query and provides a result of an execution of the new query to the client.

17 Claims, 6 Drawing Sheets

DUPLICATE SEARCH OPTIMIZATION

TECHNICAL FIELD

Embodiments of the present invention relate to management of virtual machines, and more specifically, to providing up-to-date monitoring results in a virtual machine environment.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

The virtualization technologies have wide applications in the computer field with the development of computer systems. For example, such virtualization technologies can be used to implement a virtual desktop application which runs within a virtual machine of a host and accessed from a client over a network.

In a large organization, thousands of virtual machines can be run on one or more hosts, making it very difficult for a system administrator to manage the virtual machines. One existing solution employs a host controller that monitors the operation of the virtual machines and allows an IT administrator to add a new virtual machine, delete an existing virtual machine, migrate a virtual machine to a different host, or perform any other action based on up-to-date information provided by the host controller. The host controller may also monitor resources, usages, hardware/software configurations, and other parameters of the virtual machines. The up-to-date information for the virtual machine system can be displayed to a user (e.g., an IT administrator) on the user's client machine via a graphical user interface (GUI). Multiple users (e.g., multiple administrators) may use multiple clients to send multiple queries for information about objects in the virtual machine system. Many of the queries sent by the users and/or clients may be similar and the host controller may constantly execute these similar queries.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

A method and system for providing up-to-date monitoring results in a virtual machine system are described. The virtual machine system may include one or more host servers hosting virtual machines, a host controller coupled to the host servers to manage the virtual machines, and multiple clients coupled to the host servers via a network. In one embodiment, the host controller receives a new query pertaining to one or more objects in the virtual machine system from a client. The objects can be, for example, host servers, virtual machines, guest operating systems, virtual desktops or other applications of the virtual machines, base images of virtual machines, users, etc. Upon receiving the new query from the client, the host controller determines whether the new query is similar to any queries previously received from clients. If the new query is not similar to any previously received queries, the host controller executes the new query and provides the execution result of the new query to the client. Otherwise, if the new query is similar to any previously received query, the host controller provides a result of a last execution of a similar query to the client, associates the client with the similar query, periodically re-executes the similar query, and sends the execution results to all clients associated with the similar query.

By combining the execution of similar queries received from different clients, embodiments of the present invention significantly reduce the amount of processing and resource usage on a host controller, thus improving the performance of the host controller.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
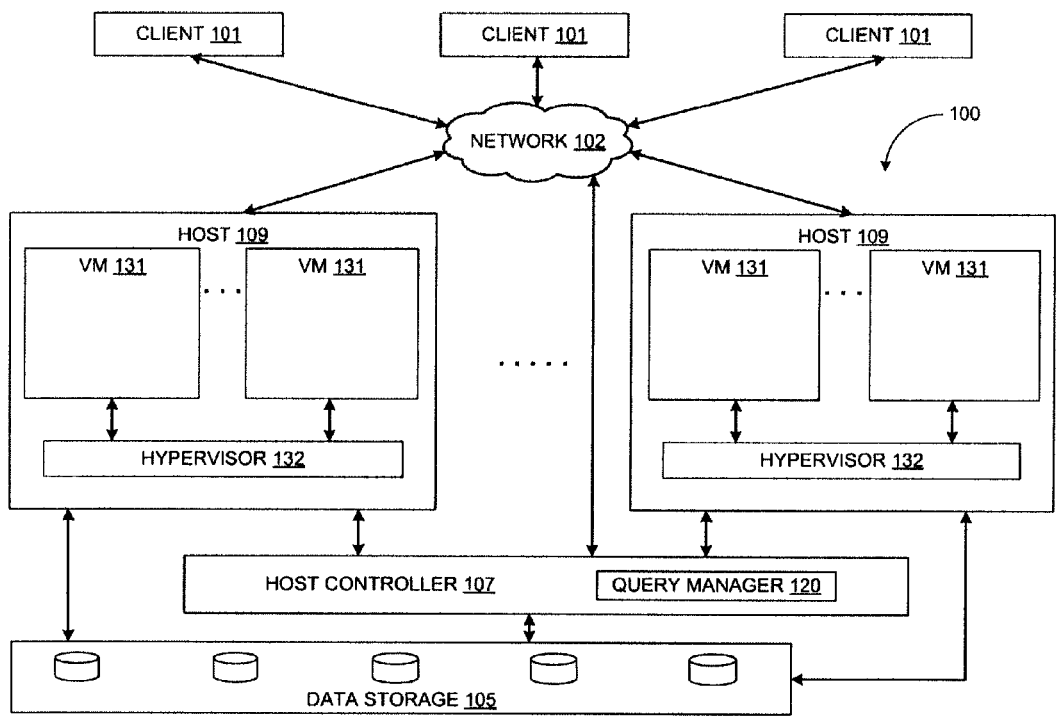
FIG. 1 is a block diagram of an exemplary network architecture in which embodiments of the invention may operate.

FIG. 1 illustrates an exemplary network architecture 100 in which embodiments of the present invention may operate. The network architecture 100 includes hosts 109 coupled to clients 101 over a network 102. The hosts 109 may be a personal computer (PC), a server computer, a personal digital assistant (PDA), a smart phone, a laptop computer, or any machine capable of executing a set of instructions (sequential or otherwise) that specify actions to be taken by that machine. The network 102 may be a private network (e.g., a local area network (LAN), a wide area network (WAN), intranet, etc.) or a public network (e.g., the Internet). The hosts 109 are also coupled to data storage 105. The data storage 105 includes one or more mass storage devices (e.g., disks), which form a storage pool shared by all of the hosts 109 in the cluster 103.

Each host 109 may host one or more virtual machines 131. Each virtual machine 131 runs a guest operating system (OS) that may be different from one virtual machine to another. The guest OS may include Microsoft Windows®, Linux®, Solaris®, Mac® OS, etc. Each host 109 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 is part of a host operating system.

The clients 101 may include computing devices that have a wide range of processing capabilities such as PCs, PDAs, smart phones, laptop computers, etc. The clients 101 may access the virtual machines 131 over the network 102. In one scenario, each virtual machine 131 provides a virtual desktop for the client 101. From the user's point of view, the virtual desktop functions as a physical desktop (e.g., a personal computer) and is indistinguishable from a physical desktop.

The hosts 109 may be managed by a host controller 107. The host controller 107 may be a computer coupled to the hosts 109 directly or via the network 102. The host controller 107 may also be in communication with the clients 101, via the network 102. Alternatively, the host controller 107 may be part of one of the hosts 109. The host controller 107 may add a virtual machine, remove a virtual machine, change a virtual machine (e.g., add/remove/replace virtual hardware), power on/off the hosts 109, provide directory service to the virtual machines 131, and perform other managerial functions. The host controller 107 may also have access to the data storage 105 to store and/or retrieve data.

According to one embodiment of the present invention, the host controller 107 includes a query manager 120 to execute queries received from the clients 101 and to provide results of the queries to the clients 101. The clients 101 may send queries requested by users of the clients 101 or by applications executing on the clients 101. The queries may relate to various objects in the virtual machine system. The objects of the virtual machine system may include, for example, host servers, virtual machines, guest operating systems, virtual desktops or other applications of the virtual machines, base images of virtual machines, users, etc. For example, a query may inquire about resource usage (e.g., CPU usage, memory usage, storage usage, etc.), or availability of the virtual machines 131. In another example, a query may require to show all desktops that are running on a host that has a CPU usage greater than 90 percent. Other examples of queries may include, but are not limited to, queries regarding object identifiers (e.g., host or virtual machine names), whether certain hardware and/or software is present in a virtual machine 131, the type of guest operating system or environment running on a virtual machine 131, and capabilities of a virtual machine 131.

The query manager 120 periodically re-executes the queries of various clients 101 to obtain up-to-date information for the relevant object(s) in the virtual machine system 120. In one embodiment, the query manager 120 correlates queries of different clients 101 to minimize the number of executed queries. In particular, the query manager 120 may maintain a list of current queries, with each query in the list being associated with one or more clients 101 receiving the query results. When the query manager 120 receives a new query from client 101, the query manager 120 may compare the new query with the queries in the list to determine if the new query is similar to any query in the list. In one embodiment, the new query is considered similar to an existing query if the objects specified in both queries are the same even when the ordering of the specified objects is different (e.g., a new query specifying Name="X" and Type="Desktop" is considered similar to an existing query specifying Type="Desktop" and Name="X").

If the query manager 120 determines that the new query is different from the queries in the list, the query manager 120 may add the new query to the list, execute the new query, and send the result to the client 101. If the new query is similar to any query in the list, the query manager 120 may associate the client 101 with the similar query, and send the result of the last execution of the similar query to the client 101. Subsequently, when the similar query is re-executed, the query manager 120 may send the execution results to all the clients associated with the similar query including the client 101.

Figure 2:
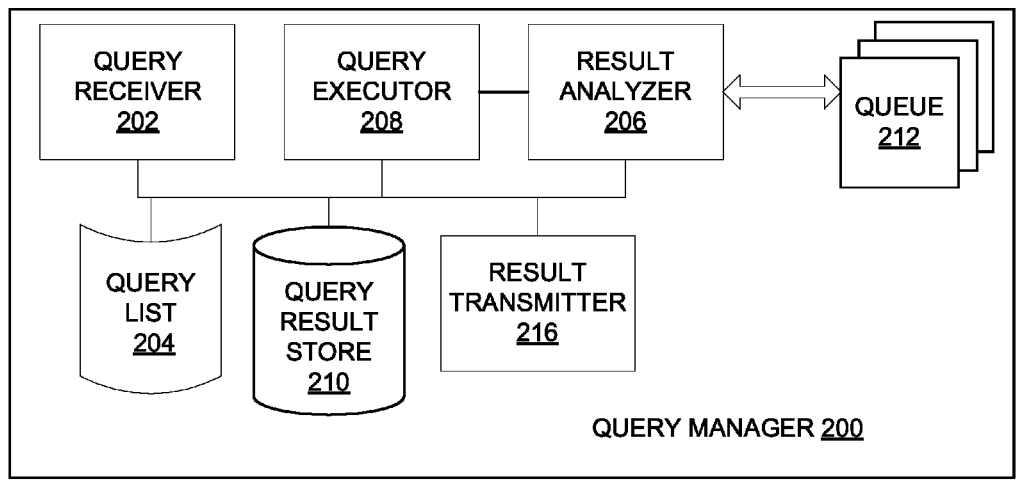
FIG. 2 is a block diagram illustrating one embodiment of a query manager.

FIG. 2 is a block diagram illustrating one embodiment of a query manager 200. The query manager 200 may include a query receiver 202, a query executor 208, a result analyzer 206, a result transmitter 216, a query result store 210 and a query list 204. More or less components may be included in the query manager 120 without loss of generality.

The query list 204 may include queries previously submitted by clients, with each query being associated with one or more clients that submitted the query and are registered to receive the query results. For example, a client "A" may submit a query "X" and a client "B" may submit query "X" and query "Y." The query list 204 may store query "X" in association with clients "A" and "B" that are registered to receive the results of query "X" and may store query "Y" in association with client "B" that is registered to receive the results of query "Y."

The queries may pertain to objects or attributes of objects in the virtual machine system. The objects of the virtual machine system may include, for example, host servers, virtual machines, guest operating systems, hypervisors, virtual desktops or other applications of the virtual machines, base images of virtual machines, users, etc. The attributes of an object may include, for example, the name of an object, the type or role of an object, a characteristic of an object (e.g., a performance characteristic), etc. The query result store 210 may include a result of a last query execution for each query in the query list 204.

The query receiver 202 receives new queries from different clients and compares each new query with queries in the query list 204. If the query list 204 includes a similar query, the query receiver 202 associates the similar query with the client that requested the new query, and invokes the result transmitter 216 to provide a result of a last execution of the similar query to the requesting client. If the query list 204 does not include a similar query, the query receiver 202 adds the new query to the query list 204, associates the new query with the client that requested the new query, invokes the query executor 208 to execute the new query, and stores the result in the query result store 210. The result transmitter 216 then provides this result to the requesting client.

The query executor 208 periodically re-executes queries from the query list 204 to refresh the results of the queries and/or to keep the results of the queries up to date. When the query executor 208 re-executes the queries, the updated (e.g., refreshed) results may be sent to the clients associated with the query. Continuing from the example above, the query executor 208 may re-execute query "X" and query "Y." The updated results of query "X" will be sent to the clients "A" and "B" that are associated with query "X," and the updated results of query "Y" will be sent to client "B" that is associated with query "Y."

In one embodiment, the full results of the re-executed queries will be sent to the clients associated with the queries. In another embodiment, a differential result will be sent to the clients associated with the queries. That is, when the query executor 208 re-executes a query, the result analyzer 206 may compare the current result of the query with the last result of the query that is stored in the query result store 210, and determine the difference between the last result and the current result. The result transmitter 216 may then send the differential result to the clients associated with the query.

Alternatively, the result analyzer 206 may create differential results for individual clients. In particular, the result analyzer 206 may keep track of differential results sent to individual clients associated with the query, and determine the next differential result to be sent to a client based on what was previously sent to this client.

In yet another embodiment, the result analyzer 206 may maintain a separate queue 212 for each client and store every differential result to be sent to a client in a queue 212 associated with the client. A differential result may be stored in the queue 212 with a unique identifier (e.g., an identifier of a corresponding query and the timestamp of the differential result). Upon receiving a receipt notification from the client for a specific differential result, the result analyzer 206 may remove this differential result from the queue 212. Subsequently, the result analyzer 206 may combine a new differential result with differential results still remaining in the queue 212, and invoke the result transmitter 216 to send the combined differential results to the client.

Figure 3:
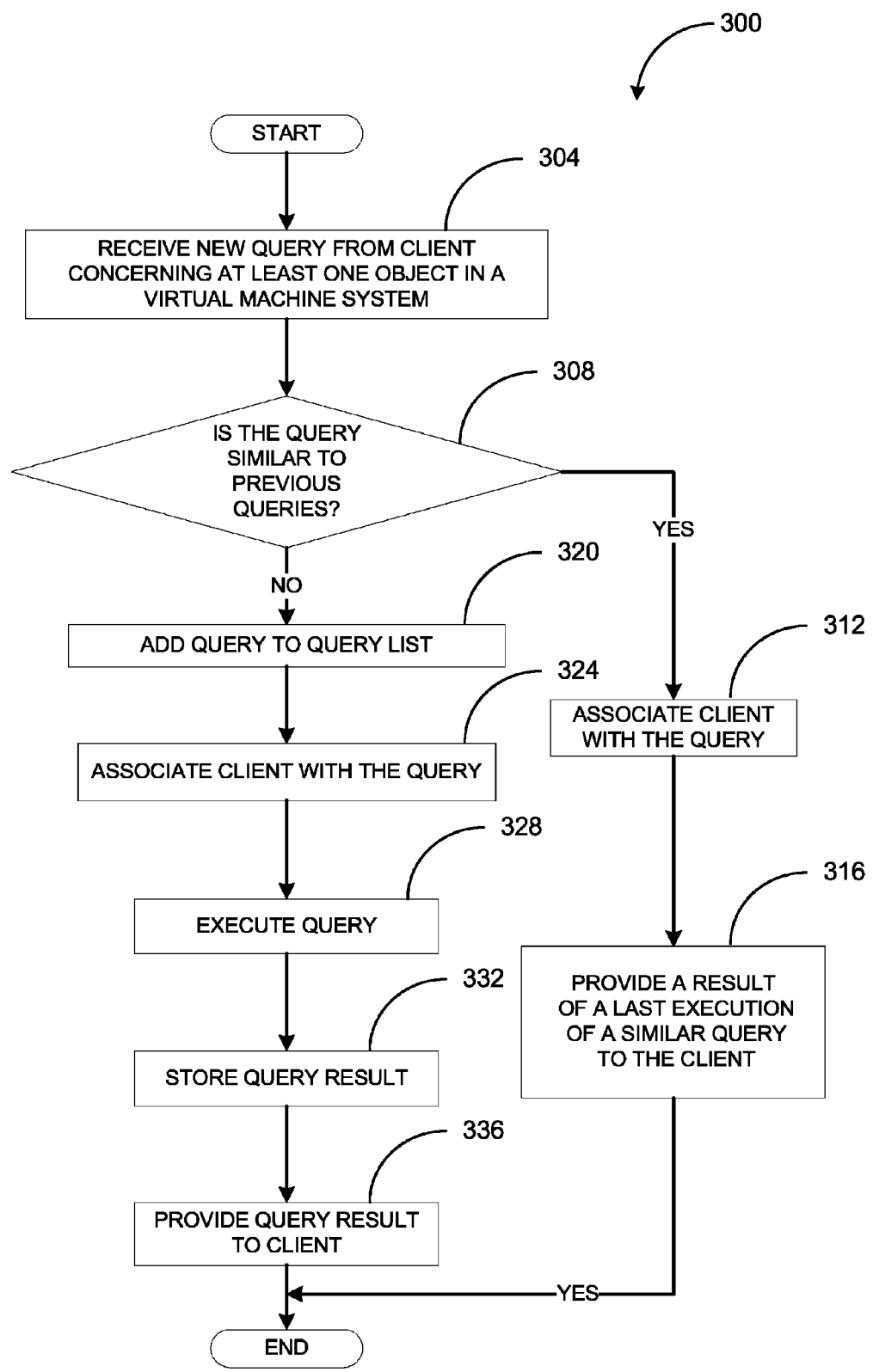
FIG. 3 is a flow diagram illustrating a method for handling a new query of a client in a virtual machine environment, in accordance with one embodiment.

FIG. 3 is a flow diagram illustrating a method for handling a new query of a client in a virtual machine environment, in accordance with one embodiment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a control server (e.g., a host controller 107 of FIG. 1).

Referring to FIG. 3, the method 300 begins with a host controller receiving a new query from a client concerning at least one object in the virtual machine system (block 304). The queries may be specified by a user and/or by an application (e.g., a GUI or virtual machine management software) executing on a client. In one embodiment, the client may send queries to obtain up-to-date results on specific objects of the virtual machine system. These objects can be, for example, host servers, virtual machines, guest operating systems, virtual desktops or other applications of the virtual machines, base images of virtual machines, users, etc.

At block 308, the host controller may determine if the query received from the client is similar to any previously received query. The previously received queries may be received from other clients and may be stored in association with respective client identifiers as a query list (e.g., in a table, file or any other data structure). In one embodiment, the host controller may analyze objects specified in the query to determine if the query received from the client is similar to previously received queries. The host controller may determine that the query is similar to a previously received query if the same objects are specified in the query, regardless of the order of the objects specified in the query. For example, the host controller may receive a query for all virtual machines running operating system "W" and with a CPU usage less than "C." The host controller may determine that this query is similar to a previously received query for all virtual machines with a CPU usage less than "C" and running operating system "W." In another embodiment, the host controller system may determine that a query is similar to a previously received query if the query is identical to a previously received query (e.g., the order of the objects and/or criteria specified in the query is identical).

If the host controller determines that a query received from a client is similar to a previously received query, the host controller may associate (e.g., correlate) the requesting client with the similar query in the query list (block 312). At block 316, the host controller may provide a result of a last execution of the similar query to the requesting client.

If the host controller determines that the query received from the client is not similar to any previously received query, the host controller may add the query to the query list (block 320), and may associate (e.g., correlate) the requesting client with the query. At block 328, the host controller may execute the query (block 328). When executing the query, the host controller may communicate with one or more objects in the virtual machine system (e.g., virtual machines, guest operating systems, etc.) in order to obtain the result of the query. For example, the host controller may poll or query a particular virtual machine to determine the type of guest operating system executing on the virtual machine. After executing the query, the host controller may store data pertaining to the query result in a query result store to be compared with subsequent query results and to serve as basis for future similar queries submitted by other clients (block 332). At block 336, the host controller may provide the query result to the client.

Figure 4:
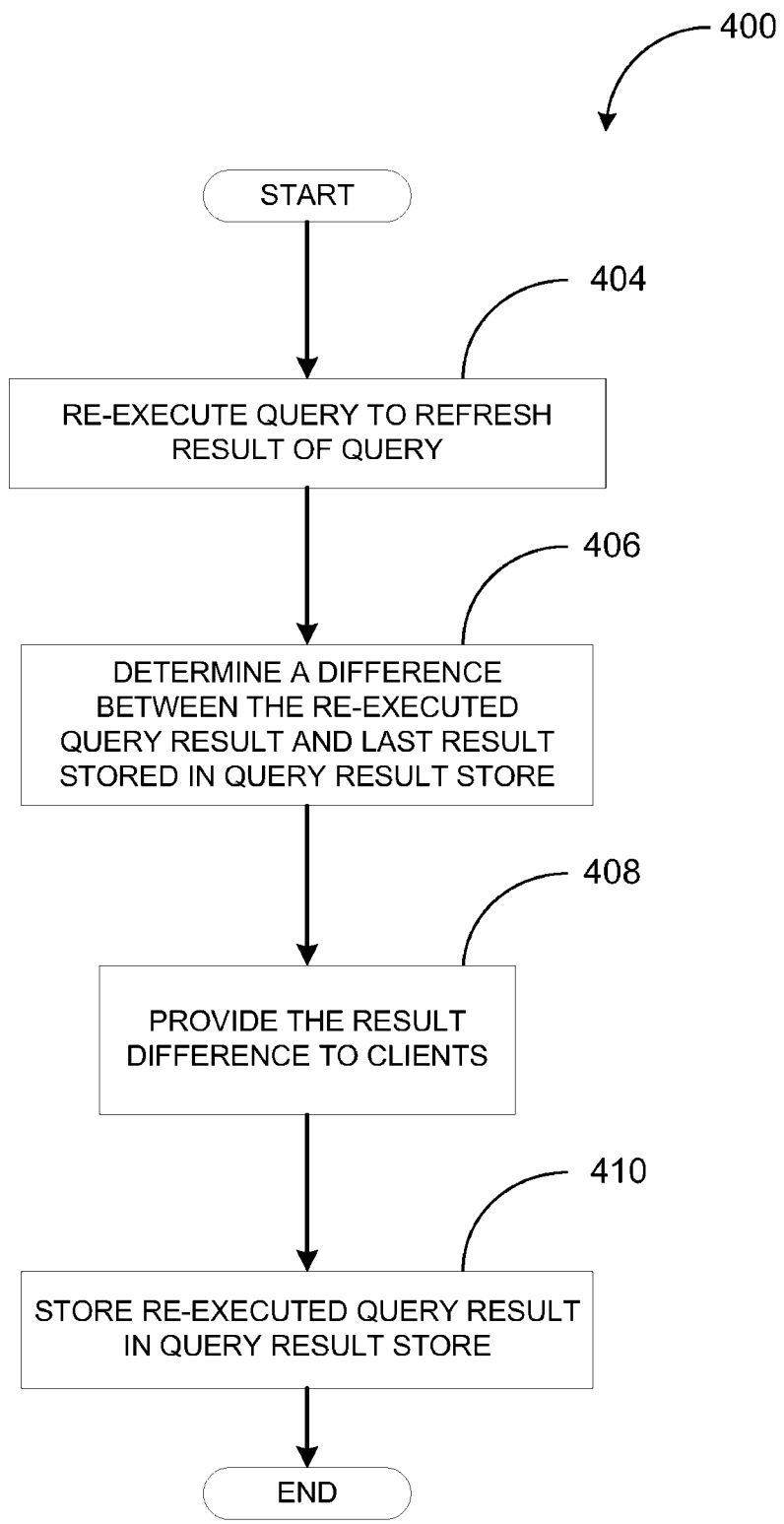
FIG. 4 is a flow diagram illustrating a method for refreshing query results in a virtual machine environment, in accordance with one embodiment.

FIG. 4 is a flow diagram illustrating a method 400 for refreshing query results in a virtual machine environment, in accordance with another embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a control server (e.g., host controller 107 of FIG. 1).

Referring to FIG. 4, the method 400 begins with the host controller re-executing a query (a new query or a similar query) to refresh the results of the query and/or to keep the results of the queries up to date (block 404). In one embodiment, the query may be re-executed according to a schedule specified by an administrator of the virtual machine system. For example, an administrator may specify that a query is to be re-executed every 60 seconds. In another embodiment, the query may be re-executed if certain changes occur to objects in the virtual machine system. For example, a query may be re-executed every time an object (e.g., a virtual machine) is added or removed from the virtual machine system.

At block 406, the host controller determines a difference between the result of the current query execution and the result of the last query execution. The difference may be identified if any of the objects in the virtual machine system have been added, removed or updated or if any of their characteristics (e.g., performance characteristics) have changed. If there is no difference, method 400 ends. If there is a difference, the host controller identifies clients associated with the query (e.g., using the query list), and provides the difference between the current execution result and the last execution result stored in a query result store to the clients associated with the query (block 408). The host controller also stores the current execution result in the query result store (block 410) for comparison with subsequent query results and as basis for future similar queries submitted by clients.

In an alternative embodiment (not shown), the host controller monitors result differences per client. In particular, the host controller records, for each client, whether the client was provided with the last execution result in the form of a full query result (if it was the first result for the client) or in the form of a result difference (if it was a second or subsequent result for the client). If the client was provided with the last execution result, the host controller knows that the query result should be refreshed for this client and will send a result difference to the client upon the next execution of the query. If the client has not been provided with the last execution result, the host controller will send the full query result to the client upon the next execution of the query.

Figure 5:
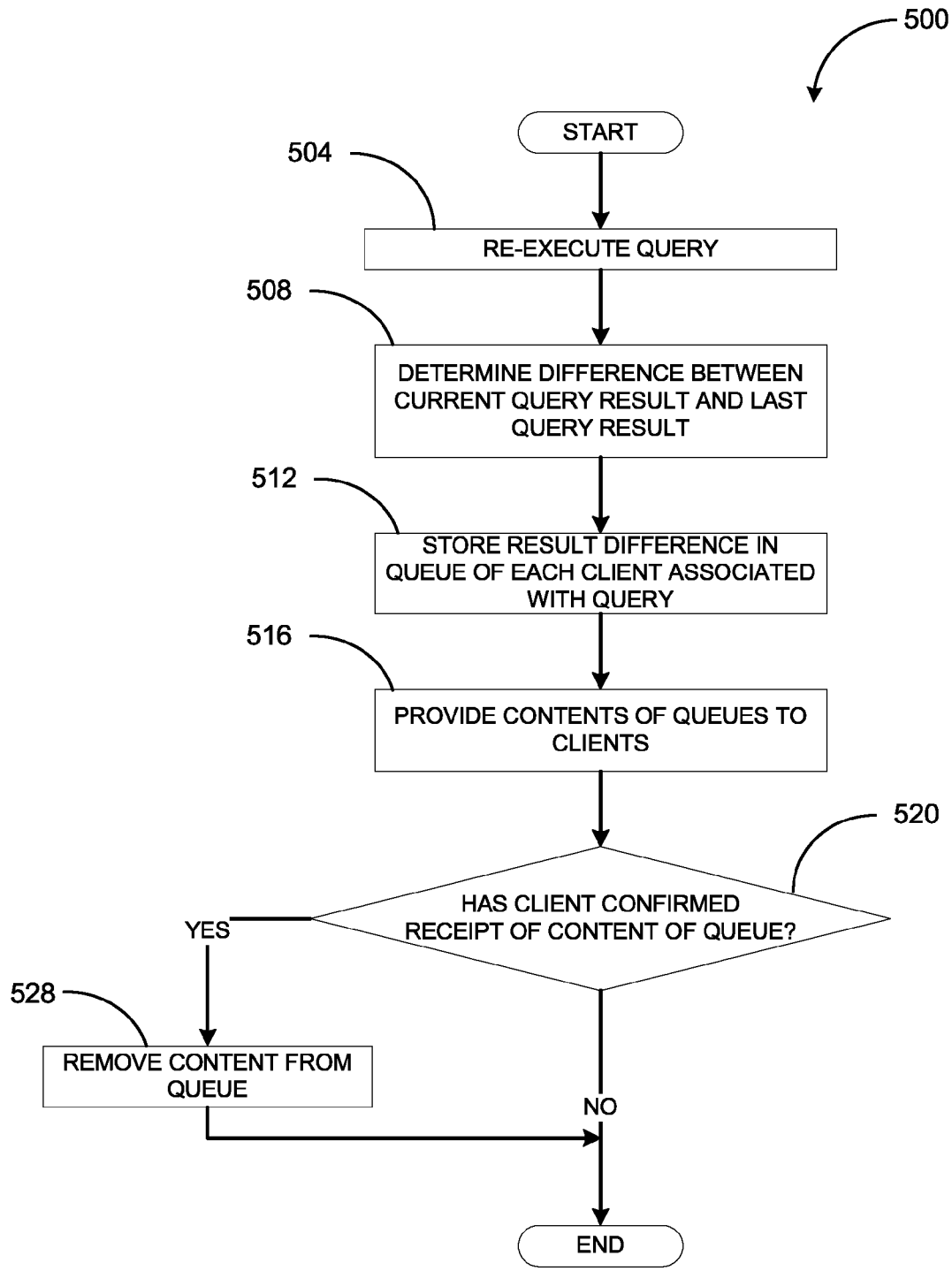
FIG. 5 is a flow diagram illustrating a method for providing query results using per-client queues in a virtual machine environment, in accordance with one embodiment.

FIG. 5 is a flow diagram illustrating a method 500 for providing query results using per-client queues in a virtual machine environment, in accordance with a further embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by a control server (e.g., host controller 107 of FIG. 1).

Method 500 ensures that a client receives all updates for queries that the client is registered for. In particular, when a host controller receives a first query from a new client, the host controller creates a queue for this client, and determines whether the first query is similar to any other queries received from other clients. If the first query is not similar to any queries in the query list, the host controller adds the first query to a query list, associates the first query with the requesting client, executes the first query, and places the query result in the client queue. If the first query is similar to any query in the query list, the host controller associates the similar query with the requesting client in the query list, retrieves the result of the last execution of the query from a query result store, and places the last query result in the client queue. Further, the host controller sends the content of the client queue to the client, and waits for a client notification indicating that the client has received the content. Upon receiving the notification from the client, the host controller removes the content from the queue.

Referring to FIG. 5, the host controller subsequently re-executes the query to refresh the query result (block 504) and determines a difference between the current query result and the last query result (block 508). For example, the last result provided to the client for query "S" may include records for objects P, Q, and R. The current query result may include records for objects O, P, Q, and R. The host controller may determine that the difference between the current query result and the last query result provided to the client is the record for object O in the current query result.

At block 512, the host controller may identify all clients associated with the query and store the result difference in a queue of each client associated with the query. A queue of a client may store previous result differences of various queries associated with the client for which the host controller has not yet received a receipt notification from the client. The client queue may store a result difference with a unique identifier (e.g., an ID of a corresponding query and a timestamp of the result difference).

At block 516, the host controller provides the contents of the queues to corresponding clients and waits for receipt notifications from the client. Upon receiving a receipt notification from a client (block 520), the host controller removes the content sent to the client from the queue (e.g., the queue is flushed).

In one embodiment, if the client has not confirmed receipt of the content of the queue, the host controller may continue to wait for the client to confirm receipt of the queue content for a predefined time period. When the predefined time period expires, the host controller may decide that the client did not receive the last transmission (e.g., due to network problems) and may re-provide (e.g., re-transmit and/or resend) the content of the queue to the client. If the query is re-executed again during the above predefined time interval, the host controller adds the new result difference to the queue and provides the entire content of the queue to the client when the predefined time interval expires.

Figure 6:
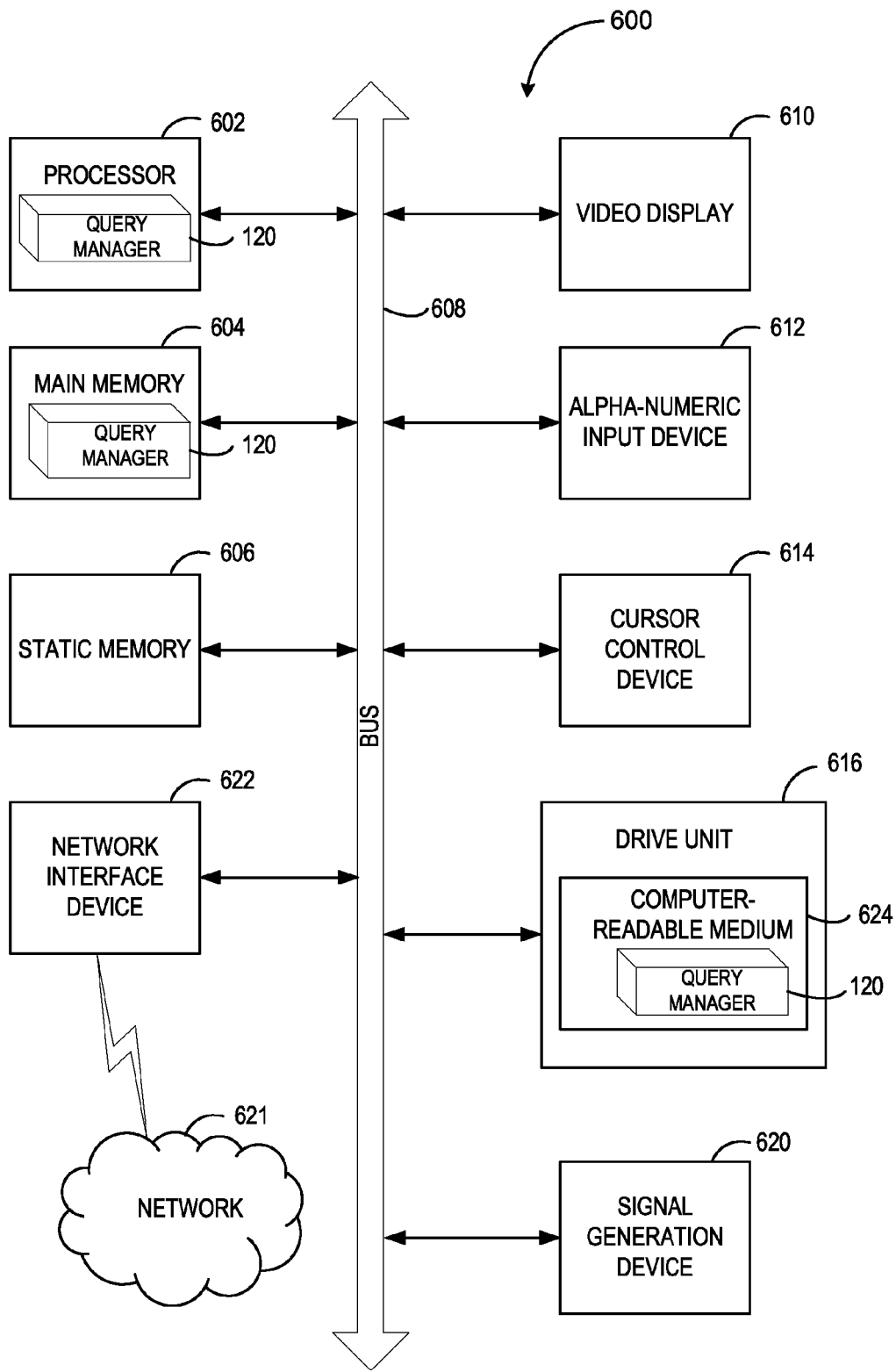
FIG. 6 illustrates a diagrammatic representation of a machine in the exemplary form of a computer system, in accordance with one embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server (e.g., the host 103) or a client machine (e.g., the client 101) in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute query manager 120 for performing the operations and steps discussed herein.

The computer system 600 may further include a network interface device 622. The network interface device may be in communication with a network 621. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., query manager 120) embodying any one or more of the methodologies or functions described herein. The instructions of the query manager 120 may also reside, completely or at least partially, within the main memory 604 and/or within the processing device 602 during execution thereof by the computer system 600, the main memory 604 and the processing device 602 also constituting machine-readable storage media. The instructions of the query manager 120 may further be transmitted or received over a network via the network interface device 622.

While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "executing", "sending", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for a host controller system, the method comprising:
   maintaining, by the host controller system monitoring operation of a plurality of virtual machines, a list of a plurality of queries in association with a plurality of client devices, the plurality of queries specifying the plurality of virtual machines hosted by a plurality of host computers in a virtual machine system, the plurality of queries being continuously re-executed to refresh up-to-date information about the plurality of virtual machines that is presented on the plurality of client devices;
   receiving, by the host controller system, a new query from a first client device that is different from any of the plurality of client devices, the new query specifying one or more of the plurality of virtual machines;
   determining, by a processing device of the host controller system, whether the new query is similar to any of the plurality of queries previously received from the plurality of client devices other than the first client device, wherein the determining comprises comparing the one or more virtual machines in the new query to virtual machines in the plurality of queries previously received from the plurality of other client devices;
   if the new query is similar to any of the plurality of queries previously received from the plurality of other client devices, associating a similar query with the first client device in the list, and providing data pertaining to a result of a last execution of the similar query to the first client device; and
   if the new query is not similar to any of the plurality of queries previously received from the plurality of other client devices, adding the new query to the list in association with the first client device, executing the new query, and providing a result of an execution of the new query to the first client device, the result of the execution of the new query providing up-to-date information pertaining to operation of the one or more of the plurality of virtual machines in the virtual machine system.

2. The computer-implemented method of claim 1, further comprising:
   if the new query is not similar to any of the plurality of queries previously received, storing, in a memory, data indicative of the new query.

3. The computer-implemented method of claim 1, further comprising: storing, in a memory, the result of the last execution of the similar query; and sending the result of the last execution of the similar query to each of the plurality of client devices that is associated with the similar query.

4. The computer-implemented method of claim 1, further comprising:
   periodically re-executing the similar query;
   for each client associated with the similar query:
   periodically determining a difference between an updated result of the re-executed similar query and a last result provided to the client; and
   periodically providing a result difference to the client.

5. The computer-implemented method of claim 4, further comprising:
maintaining a queue for each client device associated with the similar query;
placing each result difference resulting from an execution of the similar query in the queue of each client device;
upon receiving a notification of a result difference receipt from the client device, removing a corresponding result difference from the queue; and
when sending a new result difference to the client device, sending the new result difference with a prior result difference to the client device if the prior result difference remains in the queue.

6. The computer-implemented method of claim 1, wherein the data pertaining to the result of the last execution of the similar query comprises a complete result of the last execution of the similar query.

7. The computer-implemented method of claim 1, wherein determining whether objects specified in the new query are similar to objects specified in the previously received queries is done regardless of the ordering of the objects specified in the new query and the ordering of the objects specified in the previously received queries.

8. A system comprising:
a memory; and
a processor coupled to the memory, wherein the processor is configured to:
maintain a list of a plurality of queries in association with a plurality of client devices, the plurality of queries specifying a plurality of virtual machines hosted by a plurality of host computers in a virtual machine system, the plurality of queries being continuously re-executed to refresh up-to-date information about the plurality of virtual machines that is presented on the plurality of client devices;
receive a new query from a first client device that is different from any of the plurality of client device, the new query specifying one or more of the plurality of virtual machines;
determine whether the new query is similar to any of the plurality of queries previously received from the plurality of client devices other than the first client device, wherein the processor is to determine whether the new query is similar by comparing the one or more virtual machines in the new query to virtual machines in the plurality of queries previously received;
if the new query is similar to one of the plurality of queries previously received from the plurality of other client devices, associate a similar query with the first client device in the list, and provide data pertaining to a result of a last execution of the similar query to the first client device; and
if the new query is not similar to any of the plurality of queries previously received from the plurality of other client devices, add the new query to the list in association with the first client device, execute the new query, and provide a result of an execution of the new query to the first client device, the result of the execution of the new query providing up-to-date information pertaining to operation of the one or more of the plurality of virtual machines in the virtual machine system.

9. The system of claim 8, wherein the processor is further configured to:
if the new query is not similar to any of the plurality of queries previously received, store, in the memory, data indicative of the new query.

10. The system of claim 8, wherein the processor is further configured to send the result of the last execution of the similar query to each of the plurality of client devices that is associated with the similar query.

11. The system of claim 8, wherein the processor is further configured to:
periodically re-execute the similar query;
for each client device associated with the similar query:
periodically determine a difference between an updated result of the re-executed similar query and a last result provided to the client device; and
periodically provide a result difference to the client device.

12. The system of claim 11, wherein the processor is further configured to:
maintain a queue for each client device associated with the similar query;
place each result difference resulting from an execution of the similar query in the queue of each client device;
upon receiving a notification of a result difference receipt from the client device, remove a corresponding result difference from the queue; and
send the new result difference with a prior result difference to the client device if the prior result difference remains in the queue.

13. A non-transitory computer readable storage medium including instructions that, when executed by a processing device of a host controller system, cause the processing device to perform a method comprising:
maintaining, by the host controller system monitoring operation of a plurality of virtual machines, a list of a plurality of queries in association with a plurality of client devices, the plurality of queries specifying the plurality of virtual machines hosted by a plurality of host computers in a virtual machine system, the plurality of queries being continuously re-executed to refresh up-to-date information about the plurality of virtual machines that is presented on the plurality of client devices;
receiving, by the host controller system, a new query from a first client device that is different from any of the plurality of client devices, the new query specifying one or more of the plurality of virtual machines;
determining, by the processing device of the host controller system, whether the new query is similar to any of the plurality of queries previously received from the plurality of client devices other than the first client device, wherein the determining comprises comparing the one or more virtual machines in the new query to virtual machines in the plurality of queries previously received from the plurality of other client devices;
if the new query is similar to any of the plurality of queries previously received from the plurality of other client devices, associating a similar query with the first client device in the list, and providing data pertaining to a result of a last execution of the similar query to the first client device; and
if the new query is not similar to any of the plurality of queries previously received from the plurality of other client devices, adding the new query to the list in association with the first client device, executing the new query, and providing a result of an execution of the new query to the first client device, the result of the execution of the new query providing up-to-date information pertaining to operation of the one or more of the plurality of virtual machines in the virtual machine system.

14. The non-transitory computer readable storage medium of claim 13, wherein the method further comprises:
   if the new query is not similar to any of the plurality of queries previously received, storing, in a memory, data indicative of the new query.

15. The non-transitory computer readable storage medium of claim 13, wherein the method further comprises:
   storing, in a memory, the result of the last execution of the similar query; and
   sending the result of the last execution of the similar query to each of the plurality of client devices that is associated with the similar query.

16. The non-transitory computer readable storage medium of claim 13, wherein the method further comprises:
   periodically re-executing the similar query;
   for each client device associated with the similar query:
   periodically determining a difference between an updated result of the re-executed similar query and a last result provided to the client device; and
   periodically providing a result difference to the client device.

17. The non-transitory computer readable storage medium of claim 16, wherein the method further comprises:
   maintaining a queue for each client device associated with the similar query;
   placing each result difference resulting from an execution of the similar query in the queue of each client device;
   upon receiving a notification of a result difference receipt from the client device, removing a corresponding result difference from the queue;
   when sending a new result difference to the client device, sending the new result difference with a prior result difference to the client device if the prior result difference remains in the queue.

* * * * *